United States Patent [19]
Brieden et al.

[11] Patent Number: 5,516,425
[45] Date of Patent: May 14, 1996

[54] OIL FILTER FOR THE CLEANING OF LUBRICATING OIL

[75] Inventors: Thomas Brieden, Waiblingen; Rolf Móhle, Bretzfeld; Hubert Müller, Stuttgart; Dietmar Sonntag, Remseck, all of Germany

[73] Assignee: Mahle GmbH, Stuttgart, Germany

[21] Appl. No.: 497,635

[22] Filed: Jun. 30, 1995

Related U.S. Application Data

[63] Continuation of Ser. No. 192,856, Feb. 7, 1994, abandoned.

[30] Foreign Application Priority Data

Feb. 9, 1993 [DE] Germany ............... 43 03 695.3

[51] Int. Cl.⁶ ..................................... B01D 35/02
[52] U.S. Cl. ................ 210/232; 210/248; 210/429; 210/438; 210/440; 210/450; 210/488
[58] Field of Search .................. 210/168, 232, 210/248, 437, 438, 440, 441, 453, 455, 493.1, 454, 429, 450, 488, 493.2, 443; 184/6.24; 123/196 A

[56] References Cited

U.S. PATENT DOCUMENTS

| | | | |
|---|---|---|---|
| 3,200,953 | 8/1965 | Komarmy | 210/493.1 |
| 4,036,755 | 7/1977 | Dahm et al. | 210/168 |
| 4,094,791 | 6/1978 | Conrad | 210/443 |
| 4,322,290 | 3/1982 | Carl | 210/133 |
| 5,049,269 | 9/1991 | Shah | 210/234 |

FOREIGN PATENT DOCUMENTS

| | | |
|---|---|---|
| 314915 | 9/1988 | European Pat. Off. . |
| 2612002 | 10/1976 | Germany . |
| 3344568 | 6/1985 | Germany . |
| 3422482 | 12/1985 | Germany . |
| 3622153 | 8/1987 | Germany . |
| 3613093 | 10/1987 | Germany . |
| 3933794 | 8/1991 | Germany . |
| 3409219 | 8/1991 | Germany . |
| 3903675 | 9/1991 | Germany . |
| 4131353 | 10/1992 | Germany . |
| 4022723 | 12/1992 | Germany . |
| 869103 | 3/1984 | U.S.S.R. . |
| 1485671 | 9/1977 | United Kingdom . |

*Primary Examiner*—Matthew O. Savage
*Attorney, Agent, or Firm*—Collard & Roe

[57] ABSTRACT

An oil filter has a cap screwed to the approximately upright arranged filter housing of the oil filter for the cleaning of lubricating oil, with a ring-shaped filter insert being detachably fastened on the cap and separating the outer inflow space from the inner flow-off space. In the lower zone of the filter housing, provision is made for a valve-like acting member, which is automatically opened with each change of the filter insert and serves for discharging oil that remained in the filter housing into an oil-collecting space via a discharge duct. A center bar is rotatably connected with the cap. The center bar is axially displaceable in a limited way and has in its zone close to the cap a piston-like flange, which is sealed against the filter insert and separates the inflow space from the flow-off space. The center bar has, in its lower end zone, the valve-like acting member cooperating with the discharge duct.

6 Claims, 2 Drawing Sheets

OIL FILTER FOR THE CLEANING OF LUBRICATING OIL

This is a continuation of application Ser. No. 08/192,856 filed on Feb. 7, 1994, now abandoned.

BACKGROUND OF THE INVENTION

1. Field of the Invention

The present invention relates to an oil filter for the cleaning of lubricating oil, in particular for internal combustion engines of motor vehicles, having a filter housing with a connectable, screw-on cap. The housing is arranged at least approximately upright in the installed condition. There is a ring-shaped filter insert detachably connectable with the cap, whereby provision is made in the filter housing for an oil inlet for contaminated oil leading to the inflow space surrounding the filter insert, and for an oil outlet for cleaned oil from the flow-off space formed by the interior space of the filter insert. Furthermore, provision is made in the lower zone of the filter housing for a discharge duct connected with an oil-collecting space for oil that remained in the filter housing when the filter insert is changed. This discharge duct is automatically opened by a valve-like acting member with each change of the filter insert, but is otherwise constantly closed off.

2. The Prior Art

A known type of oil filter is described in EP-PS 03 14 915. A valve-like member is centrally arranged in the valve housing. There, it is subjected to the action of pressure springs acting in opposite directions relative to each other, of which the spring acting upon the valve-like member in the closing direction is supported on the filter insert. When the filter insert is removed, the force of the pressure spring acting in the closing direction disappears, so that the other pressure spring acting oppositely in the opening direction is capable of actuating the valve-like member in the opening direction, and thus is capable of releasing the opening to the discharge duct. Since in this connection the one pressure spring engages the filter insert unsymmetrically, the latter is stressed unsymmetrically in a disadvantageous way. Moreover, with this prior art design, the filter insert can be detached from the cap only in a troublesome way.

SUMMARY OF THE INVENTION

It is an object of the present invention to provide a superior construction for an oil filter for the cleaning of lubricating oil, in connection with which any oil that remains in the filter housing is automatically discharged with each change of the filter insert.

The above object is achieved in accordance with the present invention by providing a center bar displaceably connected with the cap, this bar being axially displaceable in a limited way and having within its zone near the cap a piston-like flange that is sealed off against the filter inset, which flange separates the inflow space from the flow-off space, and which, in its lower end zone, has a valve-like acting member which cooperates with a discharge duct. In this connection, the cap may be rotatable against the center bar.

More particularly, the present invention is directed to an oil filter for the cleaning of lubricating oil. A filter housing has a screw cap connectable thereon, with the filter housing arranged at least approximately upright in the installed condition. A ring-shaped filter inserts detachably connectable with the cap. The filter insert, at the end disposed opposite the cap, is tightly seated radially on the inside in a sliding seat on a nipple rigidly joined with the housing. There is also provided an oil inlet means in the filter housing for an oil inlet for contaminated oil to a feed-to space surrounding the filter insert, and an oil outlet means for cleaned oil from the flow-off space formed by the interior space of the filter insert. A discharge duct in the lower zone of the filter housing connects with an oil-collecting space for discharging oil remaining in the filter housing when the filter insert is changed. A valve-like acting member automatically opens the discharge duct with each change of the filter insert, but is otherwise constantly closed off. A center bar is connected with the cap with limited axial displaceability. The bar, in an end close to the cap, has a piston-like flange resting radially tightly against the filter insert in a sliding seat. The flange separates the inflow space from the flow-off space and has in a lower end zone the valve-like acting member cooperating with the discharge duct.

This results in a symmetrical structure for the oil filter, in connection with which the discharge duct is opened solely by the axial motion of the center bar required for changing the filter insert. On the other hand, during the operation of the oil filter, the center bar with the valve-like acting member fitted in the lower end zone is constantly forced downward into the closing position of the valve member. This is due to the fact that the higher pressure in the inflow space acts on the piston-like flange from the top, but from the bottom only the lesser pressure in the flow-off space acts upon the flange.

With the oil filter according to the invention, the limited axial displaceability of the center bar against the cap can be realized through interlocking members on two parts that engage one another, and through a stroke limiter, for which provision is made on one of these two parts, such limiter being directed against the other of these two parts. In this way, apart from obtaining a fixed connection between the cap and the center bar, it is possible to provide for an axial play between these two parts, such axial play being required in order to compensate for different thermal expansions and for different manufacturing tolerances of the parts. The axial play of the center bar is, furthermore, limited in the direction from the cap of the oil filter on account of the fact that the valve-like acting member is safely sealed when the oil filter is closed.

Furthermore, with the oil filter according to the invention, at least one pressure spring can be located between the cap and the center bar. On the one hand, the pressure spring supports the holding of the valve-like member in the closed position when the oil filter is in operation. On the other hand, with the assembly comprising the cap, the center bar and the filter insert removed from the filter housing, and the lower end of the center bar supported at the bottom, the pressure spring permits the filter insert to be detached from the piston-like flange by pressure applied to the cap from the top, whereby the pressure spring is compressed. For this purpose, a pressure spring can advantageously be arranged coaxially with the center bar within the zone of the flange, such pressure spring enclosing the stroke limiter and being enclosed by the interlocking members.

The correct position of the filter insert can be assured in a preferred manner by providing the insert on its inner circumference with a supporting ring, which supports itself on an inner cylindrical supporting body which is fastened in the lower part of the filter housing by a snap connection.

In order to manufacture the oil filter at a favorable cost and at a low weight for the oil filter, the filter housing can be made as a cast aluminum part. The cap can be made as an injection-molded plastic part, and the center bar with the flange and the valve-like member can be made as a molded plastic part.

An upright oil filter is known and is disclosed in DE-A-41 31 353. This filter is a combination main-flow and secondary-flow filter. The secondary-flow filter part is formed by a housing shaped by molding on a center bar, which is rotatably connected with a screw cap. The housing is divisible in order to permit an exchangeable filter element to be inserted therein. The center bar has two functions. The first function is the same as the one according to the invention, which consists in closing in the lower zone of the filter housing a discharge duct in the way of a valve, such duct being connected with an oil-collecting space. The second function consists in permitting oil flowing through the secondary-flow filter part to flow into the duct, which is closed in a valve-like way by the center bar, through the center bar while the filter is in operation.

The filter insert of the main filter part is fastened in a radially mountable way on the secondary-flow filter part, which is rigidly joined with the center bar. The part of the secondary-flow filter housing onto which the main filter insert is pushed, is a nipple which is tightly inserted in the filter housing. A particular disadvantage of this filter is the fact that the nipple, on which the filter insert of the main filter is supported, requires an additional seal in the housing. Furthermore, the surfaces against which this nipple is tightly resting in the housing have to be specially treated mechanically, which is costly.

In addition to the fact that the present invention does not relate to any combination main-flow and secondary-flow filter, the support of the filter insert, also, is constructed in a substantially simpler manner for the present invention than for the support of the main-flow filter insert described in this known prior art design.

BRIEF DESCRIPTION OF THE DRAWINGS

Other objects and features of the present invention will become apparent from the following detailed description considered in connection with the accompanying drawings which discloses the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
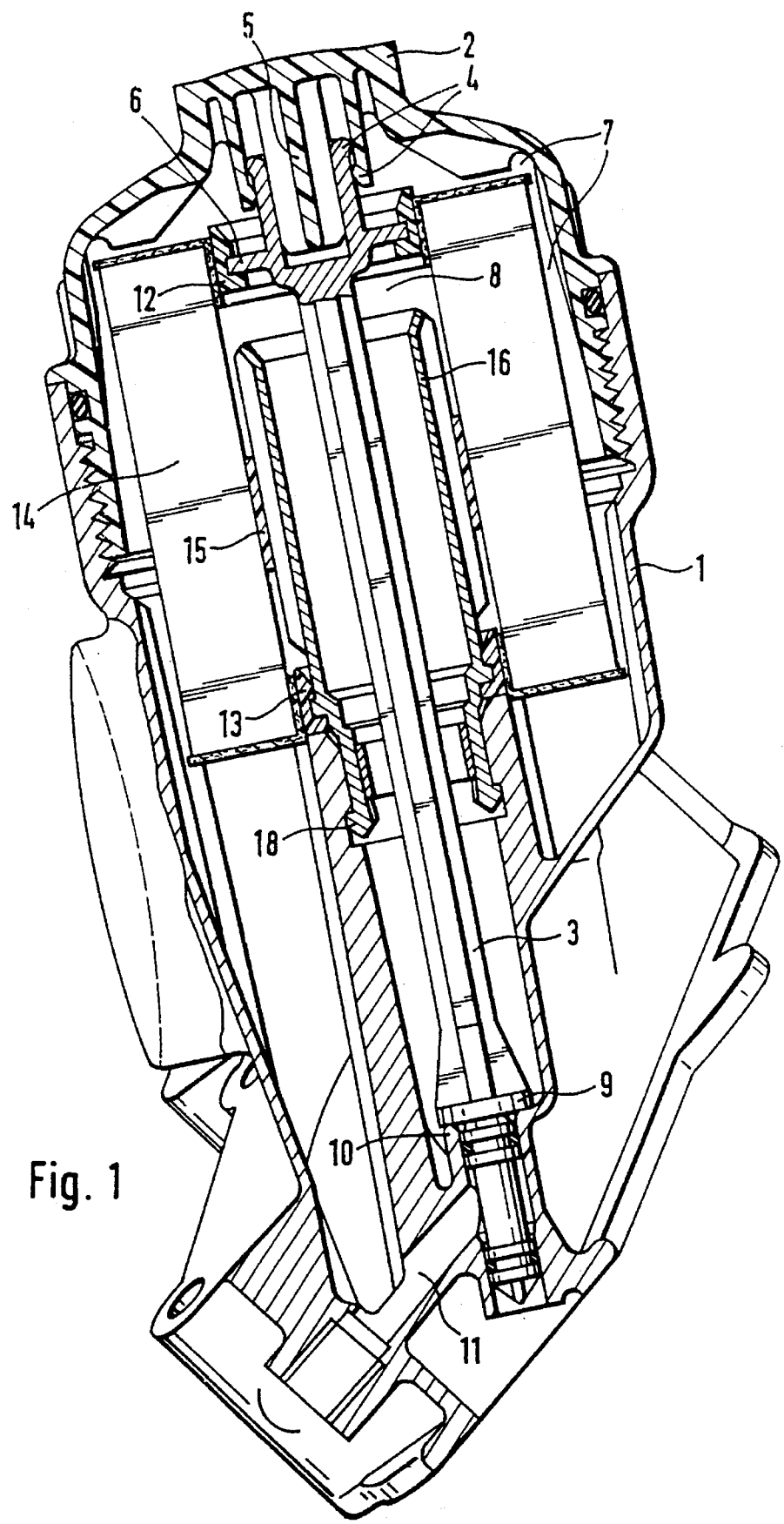
FIG. 1 shows a first embodiment of the oil filter of the invention without a pressure spring between the cap and the center bar.

Turning now in detail to the drawings, FIG. 1 shows a cap 2 which is screw-mounted on a filter housing 1 and can be unscrewed from this housing for changing a filter insert 14. On the underside of the cap 2, a center bar 3 is rotatably fastened with limited axial displaceability by means of the interlocking members 4, which engage one another. Furthermore, on the underside of the cap 2, provision is made for a central stroke limiter 5 pressing against a support surface on the center bar 3, through which the axial play between the cap 2 and the center bar 3 is limited. In its zone close to the cap, the center bar 3 has a piston-like flange 6 which, on its outer circumference, has a seal 12, against which the filter insert 14 is resting in a sealed manner with its upper end zone.

In the filter housing 1, an inflow space 7 for contaminated oil is formed outside the filter insert 14, whereas a flow-off space 8 for cleaned oil is present within the filter insert 14 and the downward extension of this space. In the filter housing 1, provision is made for one oil inlet and one oil outlet not shown in the drawings. Within the filter insert 14, provision is made for a cylindrical supporting body 16 extending from the lower part of the filter housing upwardly. This supporting body is connected with the lower part of the filter housing 1 by a snap connection 18. Within the lower zone of the supporting body 16, provision is made on the outer circumference of this body for a seal 13, against which the lower end zone of the filter insert 14 rests in a sealed manner. A supporting ring 15 resting against the supporting body 16 is present on the inner circumference of the filter insert 14.

On the lower end zone of the center bar 3 is a fitting disk 9, which cooperates with an attachment 10 and thus forms a valve-like acting member, of which the passage is opened when the center bar 3 moves upwardly, namely, toward a discharge duct 11 leading to an oil-collecting space not shown in the drawings.

Figure 2:
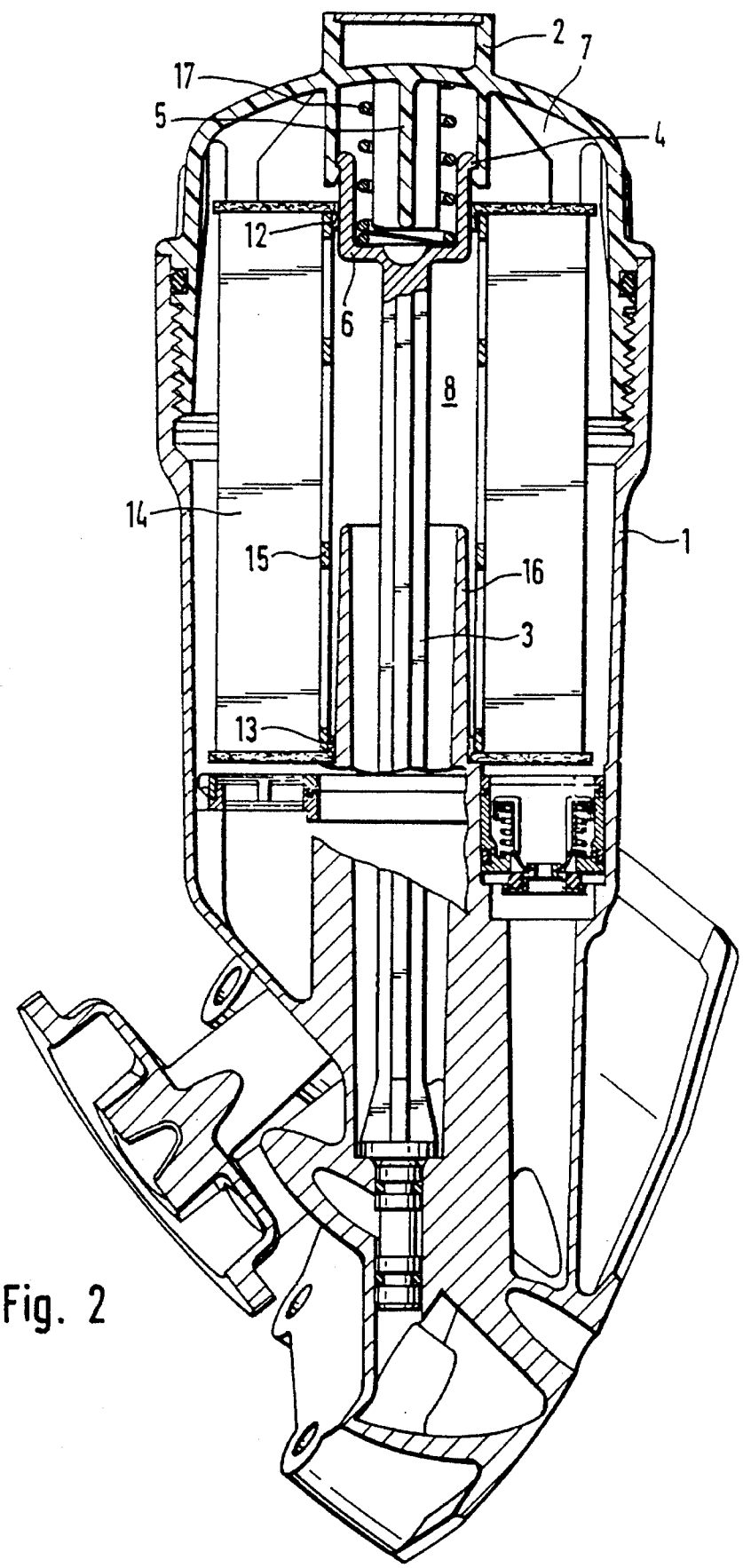
FIG. 2 shows a second embodiment of the oil filter of the invention with a pressure spring between the cap and the center bar.

Alternatively, the seals 12 and 13 can be fitted also on the filter insert 14, as shown in FIG. 2.

According to the second embodiment shown in FIG. 2, provision is additionally made in the ring-shaped space between the interlocking members 4 and the stroke limiter 5 for a pressure spring 17 to be located between the cap 2 and the piston-like flange 6 of the center bar 3. The center bar 3 in FIGS. 1 and 2 is radially spaced apart from the cylindrical supporting body 16 such that the center bar 3 may be removed from the filter without removing the cylindrical supporting body.

While two embodiments of the present invention have been shown and described, it is to be understood that many changes and modifications may be made thereunto without departing from the spirit and scope of the invention as defined in the appended claims.

What is claimed is:

1. Oil filter for the cleaning of lubricating oil, comprising:

a filter housing having an open end and a closed end opposite the open end, a screw cap connectable to the open end of said housing, and a cylindrical supporting body having a first end rigidly attached to the closed end of said housing and a second free end facing in a direction toward and being axially spaced from the open end of said housing, whereby said filter housing is arranged at least approximately upright in the installed condition;

a ring-shaped filter insert having an interior space and first and second opposed ends each respectively including an opening, wherein an inner peripheral surface of said opening at the first end of said filter insert is tightly seated radially on on a radially exterior surface of said cylindrical supporting body to form a sliding seat therewith, wherein the second free end of said cylindrical supporting body is positioned within the interior space of said filter insert;

said filter housing including an oil inlet means for feeding contaminated oil to a feed-to space surrounding the filter insert, and an oil outlet means connected to said cylindrical supporting body for directing cleaned oil from a flow-off space formed by said interior space of the filter insert;

a discharge duct in the closed end of the filter housing connected with an oil-collecting space for discharging oil remaining in the filter housing when the filter insert is changed, wherein said discharge duct is coaxially aligned with said cylindrical supporting body;

a center bar coaxially aligned with respect to said cylindrical support body, said center bar having opposed first and second opposed ends, connecting means for connecting said cap to the first end of said center bar, wherein the first end of said center bar includes a piston flange having a radially exterior surface resting radially tightly against an inner peripheral surface of the opening in the second end of the filter insert to form a sliding seat therewith, said flange separating the inflow space from the flow-off space;

a valve member attached to the second end of said center bar for automatically opening said discharge duct when said cap and center bar are removed from the housing with each change of the filter insert, wherein said valve member extends into and closes off said discharge duct when said cap and center bar are assembled to said housing;

wherein said connecting means permits rotation of said cap in relation to the center bar.

2. Oil filter according to claim 1, wherein said means for connecting the cap to the first end of said center bar comprises interlocking members on a cap first part and a center bar second part which provide limited axial displaceability of the center bar against the cap in said first and second parts, said interlocking members engaging each other, and a stroke limiter means provided on said cap first part, said limiter means being directed against the center bar second of said two parts.

3. Oil filter according to claim 2, further comprising a pressure spring between the cap and the center bar.

4. Oil filter according to claim 1, wherein the filter housing comprises a cast aluminum part;

wherein the cap comprises an injection-molded plastic part; and wherein the center bar with the flange and the valve member each comprises a molded plastic part.

5. Oil filter according to claim 3, wherein said pressure spring is coaxially located on the center bar within the zone of the flange, said pressure spring enclosing the stroke limiter means and being enclosed by the interlocking members.

6. Oil filter according to claim 1, further comprising:

a supporting ring on an inner circumference of the filter insert;

wherein said cylindrical supporting body is positioned within said supporting ring for radially supporting said supporting ring and said filter insert; and a snap connection for fastening the cylindrical supporting body in the closed end of the filter housing.

* * * * *